(12) United States Patent
Kuhl et al.

(10) Patent No.: US 8,385,899 B2
(45) Date of Patent: Feb. 26, 2013

(54) AUTOMATED APPLICATION-SELECTIVE PROCESSING OF INFORMATION OBTAINED THROUGH WIRELESS DATA COMMUNICATION LINKS

(75) Inventors: Carmen Kuhl, Espoo (FI); Sebastian Nystrom, Espoo (FI)

(73) Assignee: Nokia Corporation, Espoo (FI)

( * ) Notice: Subject to any disclaimer, the term of this patent is extended or adjusted under 35 U.S.C. 154(b) by 1071 days.

(21) Appl. No.: 11/628,701

(22) PCT Filed: Jun. 14, 2004

(86) PCT No.: PCT/IB2004/001952
§ 371 (c)(1),
(2), (4) Date: Dec. 3, 2007

(87) PCT Pub. No.: WO2006/005979
PCT Pub. Date: Jan. 19, 2006

(65) Prior Publication Data
US 2008/0254780 A1    Oct. 16, 2008

(51) Int. Cl.
*H04M 3/00* (2006.01)
*H04M 3/493* (2006.01)

(52) U.S. Cl. .................... 455/418; 455/414.2

(58) Field of Classification Search .............. 455/41.2, 455/418–420, 41.1, 414.1–414.4, 566, 556.2, 455/412.1–412.2, 455; 370/338, 328
See application file for complete search history.

(56) References Cited

U.S. PATENT DOCUMENTS

| | | | |
|---|---|---|---|
| 6,959,195 B2* | 10/2005 | Ito et al. | 455/466 |
| 6,978,118 B2* | 12/2005 | Vesikivi et al. | 455/41.1 |
| 7,079,839 B1 | 7/2006 | Papineau | |
| 7,126,481 B2* | 10/2006 | Vesikivi et al. | 340/572.4 |
| 7,376,392 B2* | 5/2008 | Myojo | 455/41.2 |
| 7,409,466 B2* | 8/2008 | Yang | 710/5 |
| 7,474,196 B2* | 1/2009 | Vesikivi et al. | 340/10.1 |
| 7,502,450 B2* | 3/2009 | Sakai et al. | 379/93.35 |
| 7,573,845 B2* | 8/2009 | Harnisch et al. | 370/329 |
| 7,653,001 B2* | 1/2010 | Agrawal et al. | 370/252 |
| 2002/0007391 A1 | 1/2002 | Suzuki | |
| 2002/0152313 A1 | 10/2002 | Nishimura et al. | |
| 2002/0188695 A1 | 12/2002 | Tso | |

(Continued)

FOREIGN PATENT DOCUMENTS
EP    1072100    2/2006
EP    1757125    2/2007

(Continued)

OTHER PUBLICATIONS

International Search Report of International Application No. PCT/IB2004/001952—Date of Completion of Search—Dec. 16, 2004.

*Primary Examiner* — Brandon Miller
(74) *Attorney, Agent, or Firm* — Locke Lord LLP

(57) ABSTRACT

The present invention provides a method for automated application-selective processing of data by a portable processor based terminal device and the portable processor based terminal device enabled to perform the aforementioned method. The data is receivable wirelessly from an external counterpart data provision entity. One or more content data is extracted from the wirelessly received data. Then it is checked whether an application, which is currently carried out on the portable processor based terminal device, is applicable or compatible with the one or more content data and in case a content data is applicable with the current running application, the content data is supplied to the application, which processed on the supplied content data accordingly.

25 Claims, 2 Drawing Sheets

U.S. PATENT DOCUMENTS

Figure 1A:
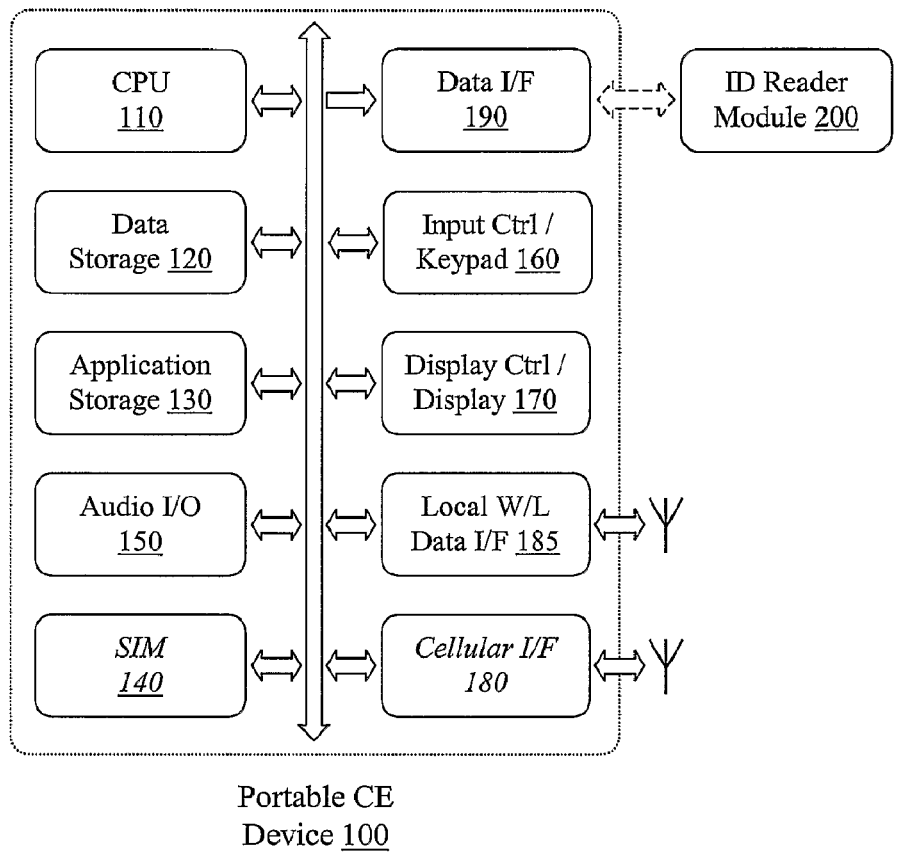

| | | |
|---|---|---|
| 2003/0032406 A1 | 2/2003 | Minear et al. |
| 2003/0134589 A1* | 7/2003 | Oba .............................. 455/3.03 |
| 2004/0034853 A1 | 2/2004 | Gibbons et al. |
| 2004/0067773 A1* | 4/2004 | Rachabathuni et al. ....... 455/560 |
| 2004/0076131 A1* | 4/2004 | Qu et al. ......................... 370/335 |
| 2004/0128400 A1 | 7/2004 | Srinivasan et al. |
| 2004/0166807 A1* | 8/2004 | Vesikivi et al. ............... 455/41.2 |
| 2004/0186883 A1* | 9/2004 | Nyman et al. ................. 709/203 |
| 2005/0226166 A1 | 10/2005 | Agrawal et al. |
| 2006/0014523 A1* | 1/2006 | Reilly ......................... 455/412.1 |
| 2008/0063156 A1* | 3/2008 | Grohn et al. ............... 379/88.16 |

FOREIGN PATENT DOCUMENTS

| | | |
|---|---|---|
| EP | 1837781 | 9/2007 |
| KR | 1020050039123 A | 4/2005 |
| WO | WO0215601 | 2/2002 |
| WO | WO 02/076077 A1 | 9/2002 |
| WO | WO03067465 | 8/2003 |
| WO | WO2005026981 | 3/2005 |

* cited by examiner

AUTOMATED APPLICATION-SELECTIVE PROCESSING OF INFORMATION OBTAINED THROUGH WIRELESS DATA COMMUNICATION LINKS

The present invention relates to the field of wireless data communication and in particular to the processing of information obtained by the means of wireless data communication technology.

BACKGROUND

The today's widespread use of portable processor based terminals being capable of wireless data communication stimulates the provision of information through wireless data communication links and the adequate prevention of the information being based on and utilizing the capabilities of portable processor based terminals. The information to be provided relates to any kind of informational content, which may be relevant for, required or desired by users of the portable processor based terminals, including for example product information, advertising information, supplementary subject-related information etc.

For instance, enhanced information services in conjunction with identification means for supply chain management, in particular being based on radio frequency identification (RFID) technology, have been purposed in the state of the art. References should be given herewith to US 2002/0139859. In general, radio frequency identification (RFID) technology relates basically to the field of local communication technology and more particularly local communication technology involving electromagnetic and/or electrostatic coupling technology. Electromagnetic and/or electrostatic coupling is implemented in the radio frequency (RF) portion of the electromagnetic spectrum, using for example such radio frequency identification (RFID) technology, which primarily includes radio frequency identification (RFID) transponders also denoted as radio frequency identification (RFID) tags and radio frequency identification (RFID) reader devices for obtaining data stored in the radio frequency transponders, which radio frequency identification (RFID) reader devices are also denoted for simplicity as radio frequency identification (RFID) readers. Radio frequency identification (RFID) transponders prepare to substitute the conventionally applied bar-code identifications used up to now for labeling any kind of products such as goods, articles, commodities and the like with specific serial numbers. One pushing advantage of radio frequency identification transponders arises from their possibility to store large storage capacity for data, which is retrieved therefrom wireless by the means of radio frequency identification (RFID) readers. Serial numbers of products once retrieved from a radio frequency identification (RFID) transponders enable for retrieving further information relating to the products labeled with the serial numbers and referred and/or identified thereby. Such further information may comprise product history information, supplementary product information, declarations of ingredients, test reports etc. The aforementioned information may be retrieved from any data storage with the help of the retrieved serial number; i.e. the serial number is processed correspondingly.

The widespread use of multimedia-enabled portable consumer electronic devices stimulates the demand to exploit this functionality for providing enhanced information provision services and information retrieval services employing the advantages of a multimedia enhanced presentation. Especially, such multimedia-enabled portable consumer electronic devices capable with wireless data communication interfaces allows to functionalize the wireless data communication capability for retrieving data of any content type.

However, the processing and presentation of data having different types of contents require the utilization of specific applications carried out on the portable processor based terminals. This means that users of the portable processor based terminals are forced to manually associate retrieved data of a particular type of contents with an adequate application capable for processing and/or presenting the data of the particular type of contents.

Nevertheless, such manual handling operated by a user appears to the user as elaborate and clumsy, especially when considering that the number of content types may grow rapidly with the usage and technical knowledge about the correct associations of content types and corresponding applications is required. Usability requires the implementation and realization of handling which is understandable and acceptable by users. Each manual user interaction requires relative high effort and may not be feasible in various places and environments. On vendor side, the acceptance of users is often critical, since the implementation is cost intensive, especially when new technology for information provision shall be introduced. In principle, the better the usability the higher the acceptance of users such that the investment of capital into the new introduced technology amortizes within a satisfactory period of time.

An object of the present invention is to provide a method and device to automate at a large extent the processing and presentation of wirelessly provided data having different types of contents by limiting the manual user interaction to a minimum required.

The object of the present invention is solved by automated application-selective processing of information obtained through wireless data communication links, which allows substantially automation of the selection operation without any user interaction.

Advantageously, the present invention provides a significant improvement in terms of user experience, as compared to solutions that would utilize merely a user interface requiring manual interaction of the user. Further, present invention eliminates the need for the end user to ever browse through applications available on the employed terminal on the search for the correct application, which is operable with received data having a defined data content type. In principle, any kind of manual interaction contradicts end user convenience and usability.

According to a first aspect of the present invention, a method for automated application-selective processing of data by a portable processor based terminal device is provided. The data is receivable wirelessly from an external counterpart data provision entity. One or more content data is extracted from the wirelessly received data. Subsequently, it is checked, whether an application, which is currently carried out on the portable processor based terminal device, is compatible or applicable or consistent with the one or more content data and in case a content data is applicable with the current running application, the content data is supplied to the application, which processed on the supplied content data accordingly.

According to an embodiment of the present invention, one or more data records are extracted from the wireless obtained data. Each data record includes content data and an identifier, which is associateable with an application available on the portable processor based terminal device. Then it is checked on the basis of the identifier whether an application, which is currently carried out on the portable processor based terminal device, is compatible or applicable with the one or more content data.

According to another embodiment of the present invention, the identifier is an identifier, which relates to a type of contents of the content data. Alternatively, the identifier is an identifier, which relates to a predefined application, which is applicable with the content data.

According to yet another embodiment of the present invention, an association information is retrieved from a registration database with the help of the identifier. The registration database maintains a plurality of association information, each of which relates to an association between an identifier and one or more applications available on the portable processor based terminal device. Subsequently, it is checked on the basis of the retrieved association information whether an application, which is currently carried out on the portable processor based terminal device, is applicable or compatible with the one or more content data.

According to a further embodiment of the present invention, a selection of options is displayed to a user of the portable processor based terminal device. The options relate to? notifications about the one or more content data. A user-selection is received in accordance with the displayed selection and an application is initiated in accordance with the user-selection. The application is applicable with the content data identified by the user-selection. Then the content data is supplied to the initiated application for being processed therewith.

According to yet a further embodiment of the present invention, the displaying of the selection is performed either the portable processor based terminal device is currently operating in idle mode; or the application, which runs currently on the portable processor based terminal device, is inapplicable or incompatible with the one or more content data.

According to an additional embodiment of the present invention, the data is received via a local wireless data communication link operable with a local wireless data interface; or the data is received with the help of an identification reading device.

According to a second aspect of the invention, a computer program product for automated application-selective processing of data by a portable processor based terminal device is provided. The computer program product comprises program code sections for carrying out the steps of the method according to an aforementioned embodiment of the invention, when the program is run on a computer, a terminal, a network device, a mobile terminal, a portable consumer electronic device, a mobile communication enabled terminal or an application specific integrated circuit. Alternatively, an application specific integrated circuit (ASIC) may implement one or more instructions that are adapted to realize the aforementioned steps of the method of an aforementioned embodiment of the invention, i.e. equivalent with the aforementioned computer program product.

According to a third aspect of the invention, a computer program product is provided, which comprises program code sections stored on a machine-readable medium for carrying out the steps of the method according to an aforementioned embodiment of the invention, when the computer program product is run on a computer, a terminal, a network device, a mobile terminal, a portable consumer electronic device or a mobile communication enabled terminal.

According to a fourth aspect of the invention, a software tool is provided. The software tool comprises program portions for carrying out the operations of the aforementioned methods when the software tool is implemented in a computer program and/or executed.

According to a fifth aspect of the invention, a computer data signal embodied in a carrier wave and representing instructions is provided which when executed by a processor cause the steps of the method according to an aforementioned embodiment of the invention to be carried out.

According to a sixth aspect of the present invention, a portable processor based terminal device allowing for automated application-selective processing of data is provided, which is adapted to receive wirelessly data from an external counterpart data provision entity. The portable processor based terminal device comprises a dispatcher module, which is firstly adapted to extract one or more content data from the wirelessly received data. Then the dispatcher module is enabled to determine whether an application currently carried out on the portable processor based terminal device is applicable with the one or more content data; and the dispatcher module is finally capable to supply the applicable content data to the application for being processed therewith.

According to an embodiment of the present invention, the dispatcher module is further adapted to extract one or more data records from the data received wirelessly. Each data record includes content data and an identifier, which is associateable with an application available on the portable processor based terminal device. The dispatcher module is capable in accordance with the identifier to determine whether the application currently carried out on the portable processor based terminal device is applicable with the one or more content data.

According to another embodiment of the present invention, the identifier is an identifier, which relates to a type of contents of the content data. Alternatively, the identifier is an identifier, which relates to a predefined application, which is applicable with the content data.

According to yet another embodiment of the present invention, the portable processor based terminal device comprises a registration database, which includes a plurality of association information. Each association information relates to an association between an identifier and one or more applications, which are available on the portable processor based terminal device. The dispatcher module is capable to retrieve an association information from the registration database in accordance the identifier; and to determine on the basis of the retrieved association information whether the application currently carried out on the portable processor based terminal device is applicable with the one or more content data.

According to a further embodiment of the present invention, the dispatcher module is adapted to display a selection of options, which relate to the one or more content data; to receive a user-selection in accordance with the displayed selection; to initiate an application in accordance with the user-selection and to supply the content data to the initiated application for being processed therewith. The application is applicable with the content data identified by the user-selection.

According to yet a further embodiment of the present invention, the dispatcher module is enabled to display the selection in case either the portable processor based terminal device is currently operating in idle mode; or the application currently carried out on the portable processor based terminal device is inapplicable or incompatible with the one or more content data.

According to an additional embodiment of the present invention, the portable processor based terminal device comprises either a local wireless data interface for receiving the data via a local wireless data communication link; or an identification reading device for receiving the data.

Figure 1B:
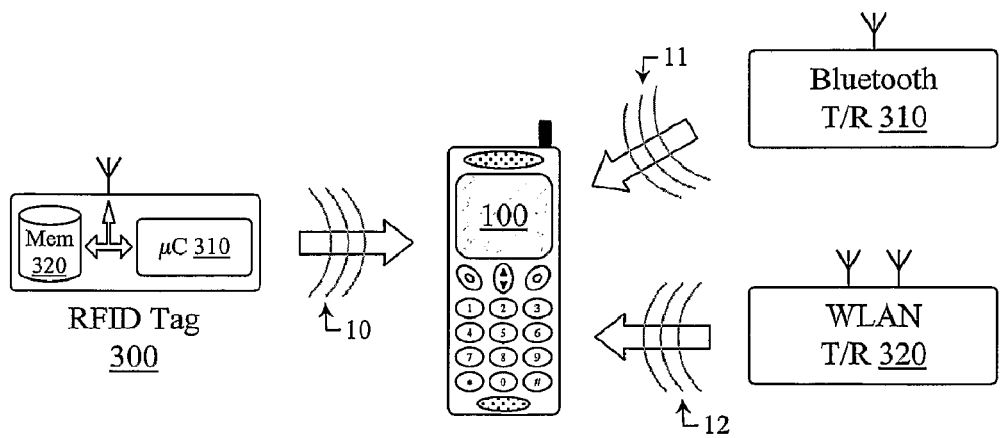
Figure 2:
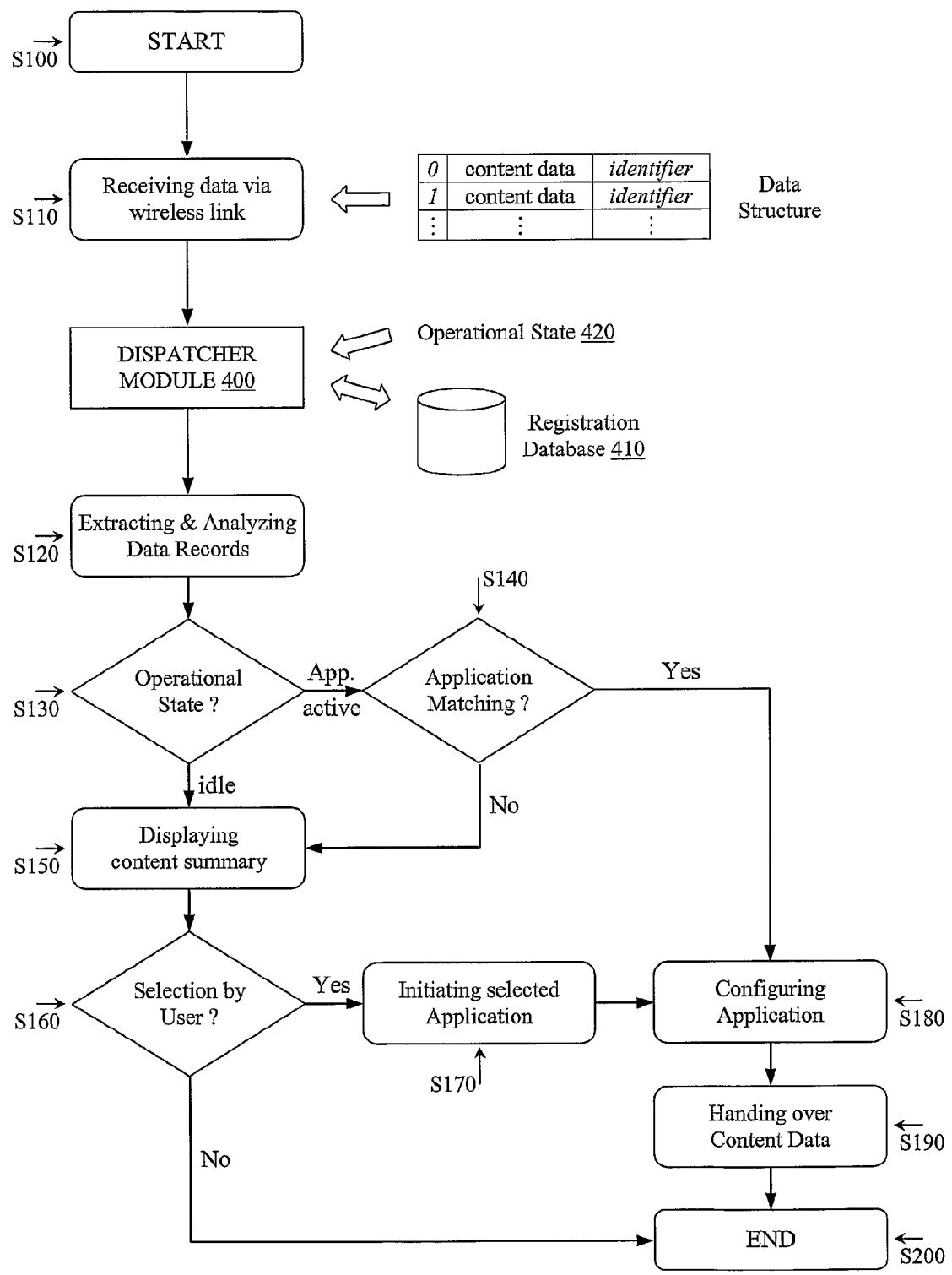

In the following, the present invention will be described in more detail with reference to embodiments and the accompanying drawings, in which FIG. 1a shows schematically an implementation of a conventional electronic microprocessor based device according to an embodiment of the present invention;

FIG. 1b shows schematically possible data acquisition scenarios according to an embodiment of the present invention; and FIG. 2 shows schematically a flow chart comprising an operational sequence according to an embodiment of the present invention.

Throughout the detailed description and the accompanying drawings same or similar components, units or devices will be referenced by same reference numerals for clarity purposes.

The block diagram of FIG. 1a illustrates structural and functional components of a principle design of a cellular terminal, which it intended to exemplary represent any kind of portable consumer electronic (CE) device 100 employable with the present invention. It shall be understood that the present invention is not limited to any specific kind of portable CE device such as that illustrated one. The illustrated portable CE device 100, which is carried out as a processor based terminal device, comprises typically a central processing unit (CPU) 110, a data storage 120, an application storage 130 and input/output means including audio input/output (I/O) means 150 (typically a microphone and a loudspeaker), a keypad or keyboard with a (key) input controller (Ctrl) 160 and a display with a display controller (Ctrl) 170.

The display and display controller (Ctrl) 170 are controlled by the central processing unit (CPU) 110 and provides information for the user. The keypad and input controller (Ctrl) 160 are provided to allow the user to input information and instructions. An information/instruction input via the keypad is supplied through the input controller to the central processing unit (CPU) 110, which may be controlled in accordance with the input information/instruction. The audio input/output (I/O) means 150 includes at least preferably a speaker for reproducing an audio signal and a microphone for recording an audio signal. The central processing unit (CPU) 110 may control the conversion of audio data to audio output signals and the conversion of audio input signals into audio data, where for instance the audio data has an adequate digital format for transmission and storage.

Additionally, the portable CE device 100 according to a specific embodiment of the present invention includes optionally a cellular interface (I/F) 180 coupled to a cellular antenna and operable with a corresponding subscriber identification module (SIM) 140. The cellular interface (I/F) 180 is arranged as a cellular transceiver to receive signals from the cellular antenna, decodes the signals, demodulates them and also reduces them to the base band frequency. The cellular interface 180 provides for an over-the-air interface, which serves in conjunction with the subscriber identification module (SIM) 140 for cellular communications with a corresponding radio access network (RAN) of a public land mobile network (PLMN). The output of the cellular interface (I/F) 180 thus consists of a stream of data that may require further processing by the central processing unit (CPU) 110. The cellular interface (I/F) 180 arranged as a cellular transceiver also receives data from the central processing unit (CPU) 110, which is to be transmitted via the over-the-air interface to the radio access network (RAN). Therefore, the cellular interface (I/F) 180 encodes, modulates and up converts the signal to the radio frequency, which is to be used. The cellular antenna then transmits the resulting radio frequency signal to the corresponding radio access network (RAN) of the public land mobile network (PLMN).

A local (short-range) wireless (W/L) data interface or tranceiver (I/F) 185 is further optionally implemented in the portable CE device 100 to provide for local wireless data communication with a corresponding counterpart network, base station and transceiver, respectively. A broad number of different technologies and standards are applicable for implementing such a local (short-range) wireless (W/L) data interface (I/F) 185.

In general, the local wireless data interface (I/F) 185 can be realized by a low-power radio frequency (LPRF) transceiver such as a Bluetooth transceiver, a WLAN (wireless local area network) transceiver, an ultra-wide band (UWB) transceiver or any other radio frequency transceiver e.g. operable with an IEEE 802.xx standard. Moreover, the local wireless data interface (I/F) 185 can be implemented likewise as an infrared-based interface such as an IrDA (infrared direct access) interface or any other proprietary radio frequency and optical interface, respectively.

An identification module and especially an identification reader module 200 is operable with the aforementioned portable CE device 100 embodied herein as a cellular terminal for the way of illustration. Different identification technologies can be applied in accordance with embodiments of the present invention, which identification technologies allow for serving identification information for enabling the inventive concept. An example selection of applicable identification technologies for communicating identification information will be presented below briefly.

The identification reader module 200 may be implemented in, attached to or coupled to the portable CE device 100 according to embodiments of the present invention. For instance, the identification reader module 200 may be provided externally to the portable CE device 100 or integrated into a detachable functional cover of the portable CE device 100. The latter means that the cover, when attached to the portable CE device 100, provides for identification technology functionality.

More generally, the identification reader module 200 is as well connectable with the portable CE device 100 via a dedicated data interface (I/F) (190). The data interface (I/F) 190 serves for interfacing data and instruction communications between the identification reader module 200 and the portable CE device 100. The data interface (I/F) 190 may be established by any appropriate hardware and/or software interfaces, which are available in the state of the art or in future.

Firstly, the identification reader module 200 implemented on the basis of radio frequency identification (RFID) technology shall be presented. Radio frequency identification (RFID) technology should be understood as comprising radio frequency identification (RFID) transponders and radio frequency identification (RFID) readers. Such RFID transponders are well known and the RFID transponders comprise in general an integrated circuit, which is coupled to an antenna element. The integrated circuit includes a storage for storing data, which is conventionally designated as its identification information. Usually, RFID transponders store any kind of data content or type of data. The integrated circuit comprises a transponder logic. RFID readers emit a radio frequency interrogation signal. Preferably, the frequency of the interrogation signal is selected to prevent interference with the other wireless data interfaces (I/F) such as the local wireless data interface (I/F) 185 or the cellular interface (I/F) 180. The interrogation signal constitutes a magnetic flux field that couples magnetically into the antenna to energize the integrated circuit and the transponder logic, respectively. Accordingly, battery or power supply is optional for RFID transponders. When a RFID transponder has been energized, the integrated circuitry thereof assembles a radio frequency response signal, which carries the stored transponder data, in particular the stored identification information. This radio frequency response signal is fed to the antenna, which causes the antenna to emit the radio frequency response signal carrying the stored transponder data, which is then receivable by the interrogating RFID reader. The RFID reader is thus able to obtain the data stored in the RFID transponder. It should be appreciated that any alternative embodiment of the RFID transponder and RFID reader might be applicable in alternative embodiments of the present invention.

The identification reader module 200 may be implemented on the basis of alternative identification technologies, in particular including visual identification technology and magnetic identification technology, which will be outlined below. Visual identification technology shall be understood as comprising one-dimensional and two-dimensional visual codes such as bar codes, which allow to code visually information, i.e. the identification information, and optical scanning means, which are adapted to detect the visual codes. The optical scanning means typically implement laser diodes operable at different frequencies for illuminating visual codes and optical photo diodes for detecting the visual code patterns. The characteristics of the photo diodes are adapted to the frequency characteristics of the illuminating laser diodes. Such one-dimensional or two-dimensional visual codes allow encoding any data contents typically on the basis of a standard encoding methodology for alphanumeric information. Magnetic identification technology shall be understood as comprising magnetic media such as a magnetic strips, which allow for magnetically storing information, i.e. the identification information, and magnetic reader devices, which are adapted to reader the information stored on the magnetic media.

Conclusively, the skilled reader should appreciate on the basis of the description above that the portable CE device 100 may represent illustratively anyone of a plurality of devices comprising in a non-limiting way a cellular terminal, a personal digital assistant, a pocket personal computer, an electronic organizer, a portable personal computer, a communicator terminal or any other consumer electronics (CE) with processing capability. The portable CE device 100 according to an embodiment of the invention includes an appropriate data communication means for obtaining wirelessly data, where the communication means comprise a local wireless data interface 185 and an identification reader module 200. In accordance with the description above, those skilled in the art should likewise note that the identification device 200 is generally adapted for obtaining data from a counterpart device providing this data.

With reference to FIG. 1b, a portable CE device 100 and a plurality of data providing entities are illustrated, which functions are well known in the art. The illustrated data providing entities including a RFID transponder, a Bluetooth transceiver (T/R) 310 and a WLAN transceiver (T/R) 320 represent exemplary a selection of data providing entities according to the present invention. In common, the illustrated data providing entities represent entities, from which data is obtainable wirelessly via the illustrated wireless data transmission path 10 and the wireless data communication links 11 and 12.

The inventive concept will be described in the following with reference to the embodiments of the portable consumer electronic device 100 illustrated above having a local wireless data communication interface (I/F) 185 or an identification reader module 200 for obtaining wirelessly data of any type of contents. It shall be noted that the invention is not limited to this specific embodiment. Nevertheless, those skilled in the art will appreciate the general functionality and capability provided by the described inventive concept. When suitable or required, references will be given to FIGS. 1a and 1b and the description referring thereto.

In an operation S100, the method for automated application-selective processing of information starts.

In an operation S11, data is received wirelessly through any of the aforementioned means enabling the wireless obtainment of data, which means include at least one out of the identification reader module 200 and the local wireless data communication interface 185. In detail, the data comprises one or more individual data records, each having a content type. The content types of the data records may differ or not. The content type is not limited to any specific type or a selection of specific types.

In general, the data contains at least the one or more individual data records, each including content data. The received data is preferably formed to enable extraction of the one or more individual data records or to enable separation into the one or more individual data records.

According to a specific embodiment of the present invention, each data record including content data comprises additionally an identifier. The identifier enables to identify an application, which is suitable for processing the content data. For instance, the identifier may be implemented as an application identifier referring to a predefined application or the identifier may be realized as a content identifier, which identifies the type of contents of the content data and in accordance with which an application suitable for processing the content data is identifiable. This means that the application identifier refers directly to a predefined application suitable for processing of the content data contained in the data record including the identifier. The content identifier refers directly to a type of contents, with which a predefined application is associated. This means that the content identifier refers indirectly to a predefined application suitable for processing of the content data contained in the data record including the identifier.

With reference to FIG. 1b, the data in question is received exemplary through any wireless communication link to the Bluetooth transceiver 310 or the WLAN transceiver 320 by the means of a local wireless data interface 185 implemented as Bluetooth interface and WLAN interface in the portable consumer electronic device 100, respectively. Alternatively, the data in question is retrieved from the illustrated RFID transponder, which stores the data for retrieval by the identification reader module 200 implemented as RFID reader in the portable consumer electronic device 100. It shall be noted that further wireless data transmission technologies are applicable; i.e. the present invention is not limited to any specific data transmission technology. It shall be further noted that the data received wirelessly may be received in accordance with a data pull service or a data push service. That means, the data is either requested by the portable consumer electronic device 100 at the counterpart data provision entity or transmitted automatically without such a request issued by the portable consumer electronic device 100.

The wirelessly obtained data is supplied to a dispatcher module 400, which is preferably implemented in the portable consumer electronic device 100 and which more preferably operates the following operations according to an embodiment of the invention. The dispatcher module 400 is allowed to access a registration database 410 and is supplied with an operational state 420 of the portable consumer electronic device 100.

The dispatcher module 400 according to an embodiment of the present invention may be implemented as software-based module, hardware-based module or both software- and hardware-based module interacting to enable the function of the dispatcher module 400. The software-based module or part of the module is constituted by one or more program code sections, which, when carried out on the portable consumer electronic device 100, enable the operation and function of the dispatcher module described below in accordance with an embodiment of the present invention.

The registration database 410 serves for associations between content data contained in a data record and applications suitable for processing of the content data contained in the data record including the identifier. For instance, each application implemented on the portable consumer electronic device 100 registers (at installation time) with the registration database 410, which maintains the registration by including one or more associations into the registration database 410. As aforementioned, the association of content data with applications suitable for processing of the content data may be performed on the basis of an identifier, which identifies an predefined application when formed as an application identifier, or which identifies the type of contents of the content data, when formed as an content identifier.

The operational state 420 is formed to define the current operation of the portable consumer electronic device 100, which current operation comprises idle mode, an operation modes relating to currently performed applications carried out on the portable consumer electronic device 100. This means the operational state 420 according to an embodiment of the present invention reflects either idle mode or one of a plurality of operation modes, each indicating the currently performed application.

In an operation S120, the data records of the wirelessly obtained data are separated from each other or the data records are extracted from the wirelessly obtained data. Furthermore, specific applications suitable for processing the data content of the data records are identified. As aforementioned, the identification of the specific applications may be based on identifiers contained in the data records and the registration database 410, which contains associations of identifiers and applications available on the portable consumer electronic device 100. In case of content identifiers, the registration database 410 contains associations between several content identifiers and applications, each designated for processing content data of the one or more registered content identifiers. In case of application identifiers, the registration database 410 contains analogously associations between several application identifiers and specific applications available on the portable consumer electronic device 100, each application designated for processing content data of the one or more registered application identifiers.

Moreover, the dispatcher module 400 may be adapted to analyze the content data of the data records to obtain identifiers of the kind defined above. The analyzing ability of the dispatcher module 400 enables the processing of the data records by a suitable application, omitting the requirement to include an identifier into the data record. The identifiers resulting from the analyzing operation are treated subsequently as described above in detail.

In an operation S130, it is checked whether the operational state 420 of the portable consumer electronic device 100 corresponds currently to idle mode or to a specific operation mode indicating a specific application currently carried out on the portable consumer electronic device 100. In case the operational state corresponds to a specific operation mode, i.e. a specific application is currently carried out on the portable consumer electronic device 100, the operational sequence continues with operation S140. Otherwise, i.e. the operational state corresponds to idle mode, the operational sequence branches to operation S150.

In an operation S140, it is checked whether the application currently carried out on the portable consumer electronic device 100 matches for processing the content data of one of the data records obtained in operation S120. The matching operation is preferably performed In case the currently running application is suitable for processing the content data of one of the data records, the operational sequence branches to operation S180. Otherwise, i.e. the application currently carried out is inappropriate to process content data of any of the data records, the operational sequence continues with operation S150.

In an operation S150, a notification is displayed to the user, which informs the user about the data records received with the wirelessly obtained data. The notification may also indicate to the user, which applications are suitable for processing, which application are registered for processing and/or which types of contents relate to the content data contained by the data records.

In an operation S160, the user is allowed to select a data record to indicate to the portable consumer electronic device 100 to process the content data of the selected data record. Alternatively, the user is also enabled to cancel the operational sequence, wherein the operational sequence branches to operation S200 thereupon.

In an operation S170, the user has instructed to process content data of one or the data records. Correspondingly, a specific application is initiated, which is suitable for processing the user-selected data content. The specific application is selected by the means of the identifier, determined by the analyzing operation of operation S120 and relating to the content data or with the help of the identifier included in the data record. The registration database 420 associates the identifier with the specific application available on the portable consumer electronic device and suitable for processing the content data.

In an operation S180, the running application is configured to receive the content data, which is handed over to the application in an operation S190. The application processes the content data, which may include a displaying of the content data, an instructing by the content data to perform further operations. The contents of the content data are not specific and the present invention is not limited to any specific operation of the application processing to content data.

In an operation S200, the method for automated application-selective processing of information is finished.

It shall be noted that the dispatcher module 400 as described herein may implement further functions. For instance, the dispatcher module 400 having access to the registration database 410 is informed about all registered application available on the portable consumer electronic device 100 and the associated types of content operable with the registered applications. Consequently, the dispatcher module 400 is enabled to identify content data of types of contents, which are not supported by any registered application. This means that the dispatcher module 400 can take no account of such content data or the dispatcher module 400 may notify the user about the detected inapplicability, which notification may comprise a suggestion about one or more applications supporting the type of contents.

The following use cases will ease the understanding of the principle concept of the present invention.

A conference poster holds a radio frequency identification (RFID) transponder that provides a uniform resource locator (URL) or uniform resource identifier (URI) to the web page of the conference, a vCard record of the contact person, and vCal record of the time schedule of the conference. The portable consumer electronic device 100 in question implements a corresponding radio frequency identification (RFID) reader, which obtains wirelessly the of information stored in the RFID transponder, when the RFID transponder and RFID reader get into close proximity. The following scenarios are possible:

The mobile phone is in idle operation mode, i.e. there is currently no application carried out on the portable consumer electronic device. A notification is displayed to the user, which informs the user about a set of options being based on the data obtained from the RFID transponder. The notification includes for instance "browse web page", "make calendar entry", "make contacts entry", "call" etc.

The calendar application is currently carried out on the portable consumer electronic device 100. A new calendarar entry is registered automatically, using the vCal data extracted from the data obtained wirelessly from the RFID transponder.

The contacts application is currently carried out on the portable consumer electronic device 100. A new contact entry is registered automatically, using the vCard data extracted from the data obtained wirelessly from the RFID transponder. In addition, the user may also be notified about the possibility to make a telephone call or send an Email or a short message in case the portable consumer electronic device implements for instance the cellular interface (I/F) 180.

The browser application is currently carried out on the portable consumer electronic device 100. On the basis of the URL extracted from the data obtained wirelessly from the RFID transponder, the web page of the conference is automatically opened, which of course requires a correspondingly adapted communication-enabled portable consumer electronic device 100 to allow access to the web page. The data communication interface allowing the access may be the cellular interface (I/F) 180, the local wireless (W/L) data interface (I/F) 185 or any other data communication interface.

The application currently carried out on the portable consumer electronic device 100 is not applicable or compatible with any content types of the data records obtained from the RFID transponder. A notification is displayed to the user informing the user about the set of options being based on the data obtained from the RFID transponder and the data records contained therein. The notification includes for instance "browse web page", "make calendar entry", "make contacts entry", "call" etc. The option "browse web page" relates to the URL/URI of the web page of the conference, the option "make calendar entry" relates to the vCal data record, and the options "make contacts entry" and "call" relate to the vCard data record. In dependence of the capability of the operating system operated on the portable consumer electronic device 100, it may be necessary to close down the currently running application in order to launch a new application.

A similar use case relates to poster showing a movie film advertising, which poster is likewise equipped with a RFID transponder, The RFID transponder stores for instance an address identifier record for downloading a trailer, an address identifier record to obtain time information at which time and in which cinema the advertised movie film is shown and an address identifier for downloading supplementary information about the movie film. The following scenarios are possible:

The mobile phone is in idle operation mode, i.e. there is currently no application carried out on the portable consumer electronic device 100. A notification is displayed to the user, which informs the user about a set of options being based on the data obtained from the RFID transponder. The notification includes for instance "play movie trailer", "display schedule information", "browse movie web page" etc.

The multimedia application is currently carried out on the portable consumer electronic device 100. The multimedia application is adapted to reproduce multimedia data such a video data. The multimedia application is supplied with the address identifier for downloading the trailer, downloads then the trailer and displays the trailer to the user.

The calendar application is currently carried out on the portable consumer electronic device 100. The calendar application is supplied with the address identifier to obtain time and location information. The information is automatically obtained from e.g. a dedicated cinema information service and the play times and cinemas are displayed by the calendar application. The user can now select to register the film movie at a selected play time and cinema with the calendar application as a new calendar entry.

The application currently carried out on the portable consumer electronic device 100 is not applicable with any content types of the data records obtained from the RFID transponder. A notification is displayed to the user informing the user about the set of options being based on the data obtained from the RFID transponder and the data records contained therein. The notification includes for instance "play movie trailer", "display schedule information", "browse movie web page" etc.

It will be obvious for those skilled in the art that as the technology advances, the inventive concept can be implemented in a broad number of ways. The invention and its embodiments are thus not limited to the examples described above but may vary within the scope of the claims.

The invention claimed is:

1. Method comprising:
    receiving data through a radio frequency identification reader at a portable processor based terminal device in response to transmission of one or more radio frequency interrogation signals by the radio frequency identification reader;
    extracting, at the portable processor based terminal device, one or more data records from said received data, wherein said one or more data records each comprise at least one content data and an associated identifier, the associated identifier relating to a type of content of the respective content data;
    displaying, by the portable processor based terminal device, a set of two or more options, wherein each option of the two or more options corresponds to a respective one of two or more applications compatible with said at least one content data based on said type of content in the portable processor based terminal device;

receiving a user-selection of any one of said two or more options from said displayed set of options;

selecting a specific application of the two or more applications, based on the received user selection, wherein said specific application is compatible with said at least one content data;

initiating said specific application; and supplying said at least one content data to said initiated application for being processed therewith.

2. Method according to claim 1, wherein said displaying of said set of options is performed
   in case said portable processor based terminal device is currently operating in idle mode.

3. Computer program product comprising a non-transitory machine-readable medium having program code stored thereon, which when executed, causes an apparatus to perform the method of claim 1.

4. Computer program product of claim 3, wherein said program code causes the apparatus to perform the method of claim 1 when said program code is executed on at least one of a computer, a microprocessor based device, a terminal, a network device, a mobile terminal, a portable consumer electronic device, or a mobile communication enabled terminal.

5. Computer program product of claim 3, wherein the apparatus is a portable processor based terminal device.

6. Method according to claim 1, wherein said data is received over a radio frequency identification link.

7. Method according to claim 1, wherein said displaying of said set of options is performed to indicate at least one of applications suitable for processing the content data, and applications registered for processing the content data based on the associated identifier of said content data.

8. Method according to claim 1, wherein identification of said specific application comprises matching identifiers contained in the data records with stored associations of identifiers and applications available on the portable processor based terminal device.

9. An apparatus, comprising:
   at least one processor;
   at least one memory including computer program code;
   the at least one memory and the computer program code configured to, with the at least one processor, cause the apparatus at least to:
   receive data through a radio frequency identification reader in response to transmission of one or more radio frequency interrogation signals by the radio frequency identification reader;
   extract one or more data records from said received data, wherein said one or more data records each comprise at least one content data and an associated identifier, the associated identifier relating to a type of content of the respective content data;
   display a set of two or more options, wherein each option of the two or more options corresponds to a respective one of two or more applications compatible with said at least one content data based on said type of content in the apparatus;
   receive a user-selection of any one or more of said two or more options from said displayed set of options;
   select a specific application of the two or more applications, based on the received user selection, wherein said specific application is compatible with said at least one content data;
   initiate said specific application; and
   supply said at least one content data to said application for being processed therewith.

10. The apparatus according to claim 9, wherein said apparatus is configured to display said set of options in case said apparatus is currently operating in idle mode.

11. The apparatus according to claim 9, comprising:
    a local wireless data interface for receiving said data via a local wireless data communication link; or
    an identification reading device for receiving said data.

12. The apparatus according to claim 9, wherein said data is received over a radio frequency identification link.

13. The apparatus of claim 9, wherein said displaying of said set of options is performed to indicate at least one of applications suitable for processing the content data, and applications registered for processing the content data based on the associated identifier of said content data.

14. The apparatus of claim 9, wherein identification of said specific application comprises matching identifiers contained in the data records with stored associations of identifiers and applications available on the apparatus.

15. Method comprising:
    receiving data through a radio frequency identification reader at a portable processor based terminal device in response to transmission of one or more radio frequency interrogation signals by the radio frequency identification reader;
    extracting, at the portable processor based terminal device, one or more data records from said received data, wherein said one or more data records each comprise at least one content data having a defined content data type;
    displaying, by the portable processor based terminal device, a set of two or more options, wherein each option of the two or more options corresponds to a respective one of two or more applications compatible with said at least one content data based on said defined content data type in the portable processor based terminal device;
    receiving a user-selection of any one of said two or more options from said displayed set of options;
    selecting a specific application of the two or more applications, based on said received user selection, wherein said specific application is compatible with said at least one content data;
    initiating said specific application; and
    supplying said at least one content data to said initiated application for being processed therewith.

16. Method according to claim 15, wherein said displaying of said set of options is performed in case said portable processor based terminal device is currently operating in idle mode.

17. Method according to claim 15, comprising:
    receiving said data via a local wireless data communication link operable with a local wireless data interface; or
    receiving said data with the help of an identification reading device.

18. Computer program product comprising a non-transitory machine-readable medium having program code stored thereon, which when executed, causes an apparatus to perform the method of claim 15.

19. Computer program product of claim 18, wherein said program code causes the apparatus to perform the method of claim 15 when said program code is executed on at least one of a computer, a microprocessor based device, a terminal, a network device, a mobile terminal, a portable consumer electronic device, or a mobile communication enabled terminal.

20. Computer program product of claim 18, wherein the apparatus is a portable processor based terminal device.

21. Method according to claim 15, wherein said data is received over a radio frequency identification link.

22. An apparatus, comprising:
at least one processor;
at least one memory including computer program code;
the at least one memory and the computer program code configured to, with the at least one processor, cause the apparatus at least to:
receive data through a radio frequency identification reader in response to transmission of one or more radio frequency interrogation signals by the radio frequency identification reader;
extract one or more data records from said received data, wherein said one or more data records each comprise at least one content data having a defined content data type;
display a set of two or more options, wherein each option of the two or more options corresponds to a respective one of two or more applications compatible with said at least one content data based on said defined content data type in the apparatus;
receive a user-selection of any one of said two or more options from said displayed set of options;
select a specific application of the two or more applications, based on said received user selection, wherein said specific application is compatible with said at least one content data;
initiate said specific application; and
supply said at least one content data to said application for being processed therewith.

23. The apparatus according to claim 22, wherein said apparatus is configured to display said set of options in case said apparatus is currently operating in idle mode.

24. The apparatus according to claim 22, comprising:
a local wireless data interface for receiving said data via a local wireless data communication link; or
an identification reading device for receiving said data.

25. The apparatus according to claim 22, wherein said data is received over a radio frequency identification link.

* * * * *